United States Patent [19]

Shouen

[11] Patent Number: 5,619,231
[45] Date of Patent: Apr. 8, 1997

[54] MULTI-DIMENSIONAL COORDINATE INPUT APPARATUS ADAPTED FOR SIMPLE INPUT OPERATION, AND SYSTEM USING THE SAME

[75] Inventor: Akihisa Shouen, Kawasaki, Japan

[73] Assignee: Fujitsu Limited, Kawasaki, Japan

[21] Appl. No.: 462,560

[22] Filed: Jun. 5, 1995

Related U.S. Application Data

[63] Continuation of Ser. No. 202,566, Feb. 28, 1994, abandoned.

[30] Foreign Application Priority Data

Apr. 28, 1993 [JP] Japan ..................... 5-102658

[51] Int. Cl.⁶ ..................................... G09G 5/08
[52] U.S. Cl. .......................... 345/163; 345/164
[58] Field of Search ..................... 345/156–158, 345/162–167

[56] References Cited

U.S. PATENT DOCUMENTS

| | | | |
|---|---|---|---|
| 4,835,528 | 5/1989 | Flinchbaugh | 345/157 |
| 4,880,968 | 11/1989 | Kwang-Chien | 345/166 |
| 4,887,230 | 12/1989 | Noguchi et al. | 345/156 |
| 4,961,138 | 10/1990 | Gorniak | 345/163 |
| 5,095,303 | 3/1992 | Clark et al. | 345/165 |
| 5,153,571 | 10/1992 | Takahashi | 345/163 |
| 5,162,781 | 11/1992 | Cambridge | 345/163 |
| 5,252,970 | 10/1993 | Baronowsky | 345/164 |
| 5,260,696 | 11/1993 | Maynard, Jr. | 345/157 |
| 5,298,919 | 3/1994 | Chang | 345/167 |

FOREIGN PATENT DOCUMENTS 60-181818  9/1985  Japan .

*Primary Examiner*—Steven Saras
*Attorney, Agent, or Firm*—Staas & Halsey

[57] ABSTRACT

A coordinate input apparatus, such as a mouse, having a hand-operated body to input coordinate information of a work plane. The body includes a bottom portion having first, second, third and fourth input planes which are not all located in the same plane. The first, second and third input planes correspond, respectively, to an X-Y coordinate plane, a Y-Z coordinate plane and an X-Z coordinate plane of a three-dimensional coordinate space. The X-Y coordinate plane, the Y-Z coordinate plane and the X-Z coordinate plane are individually selectable by selecting the corresponding input plane. Coordinate information of a work plane is input in a respective coordinate plane by selecting the coordinate plane. The fourth input plane includes a plane inclination detection unit for inputting an inclination of a work plane with respect to a selected coordinate plane.

15 Claims, 7 Drawing Sheets

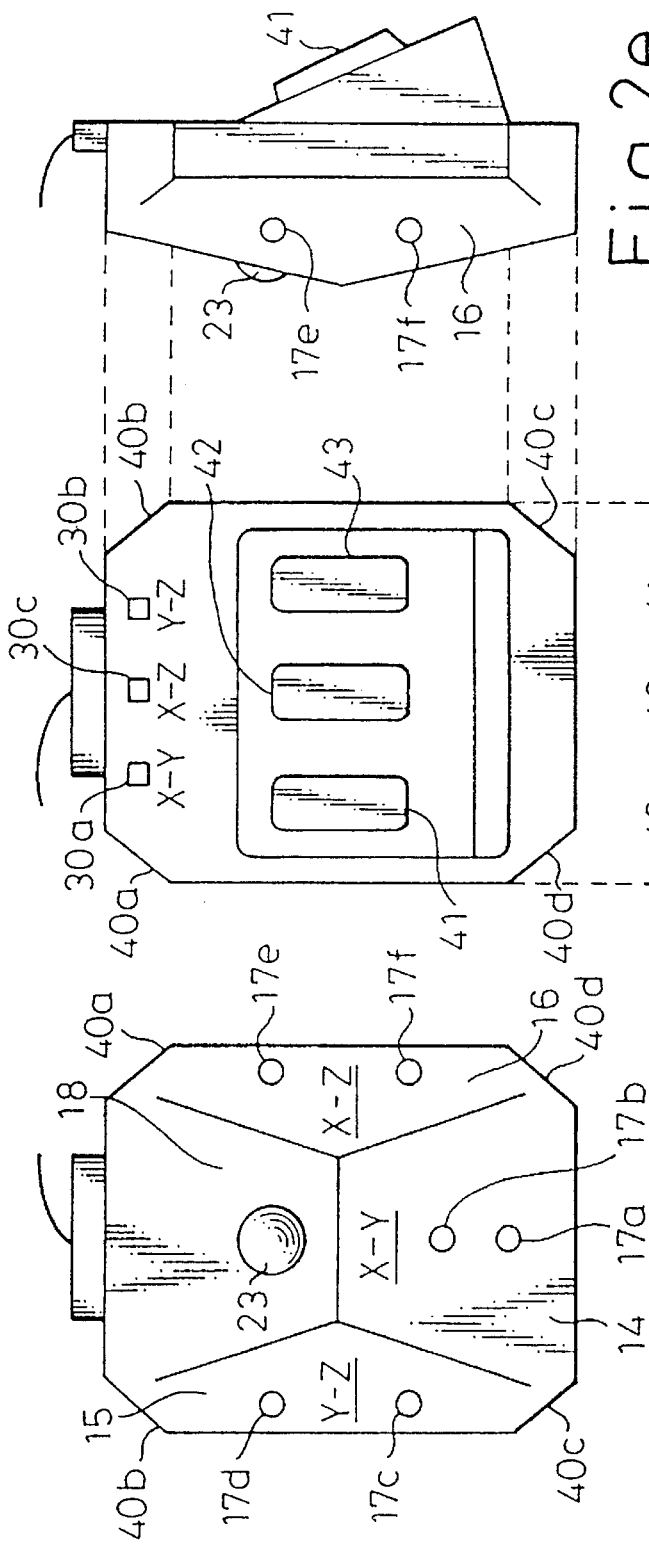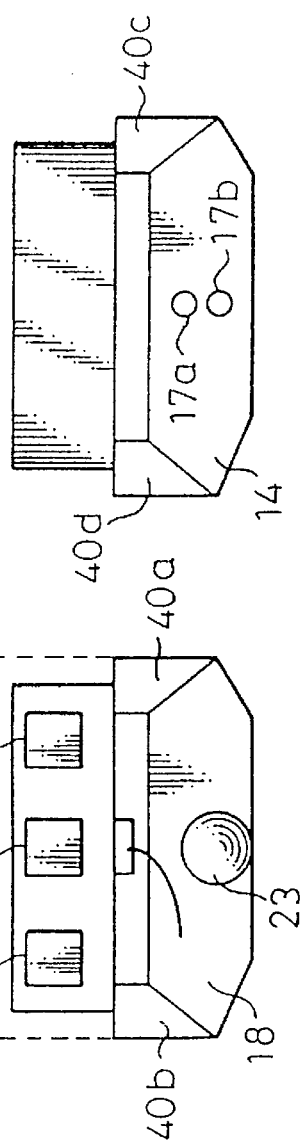

Fig.5a
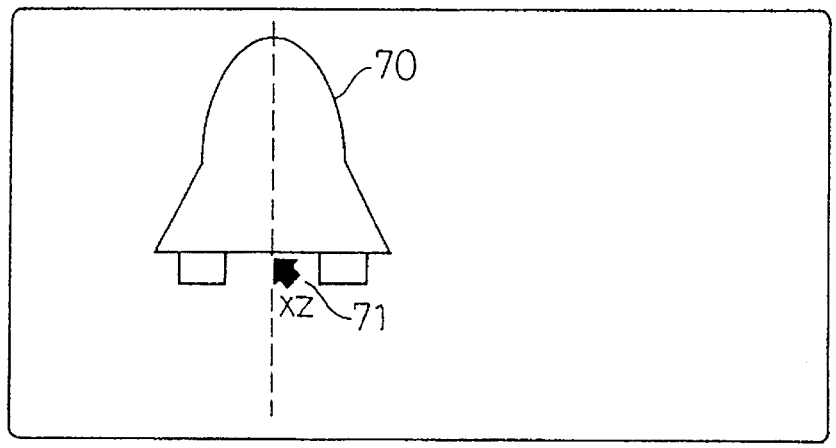
Fig.5b
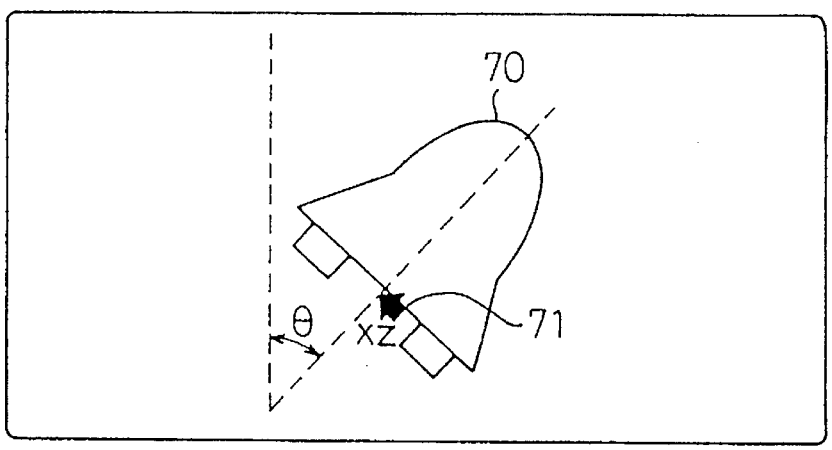
Fig.5c    Fig.5d    Fig.5e
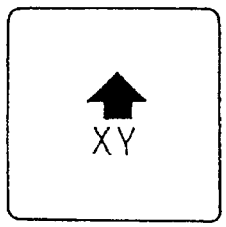 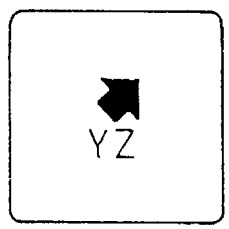 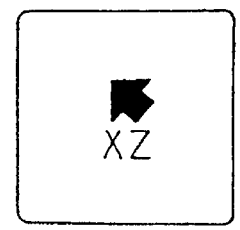

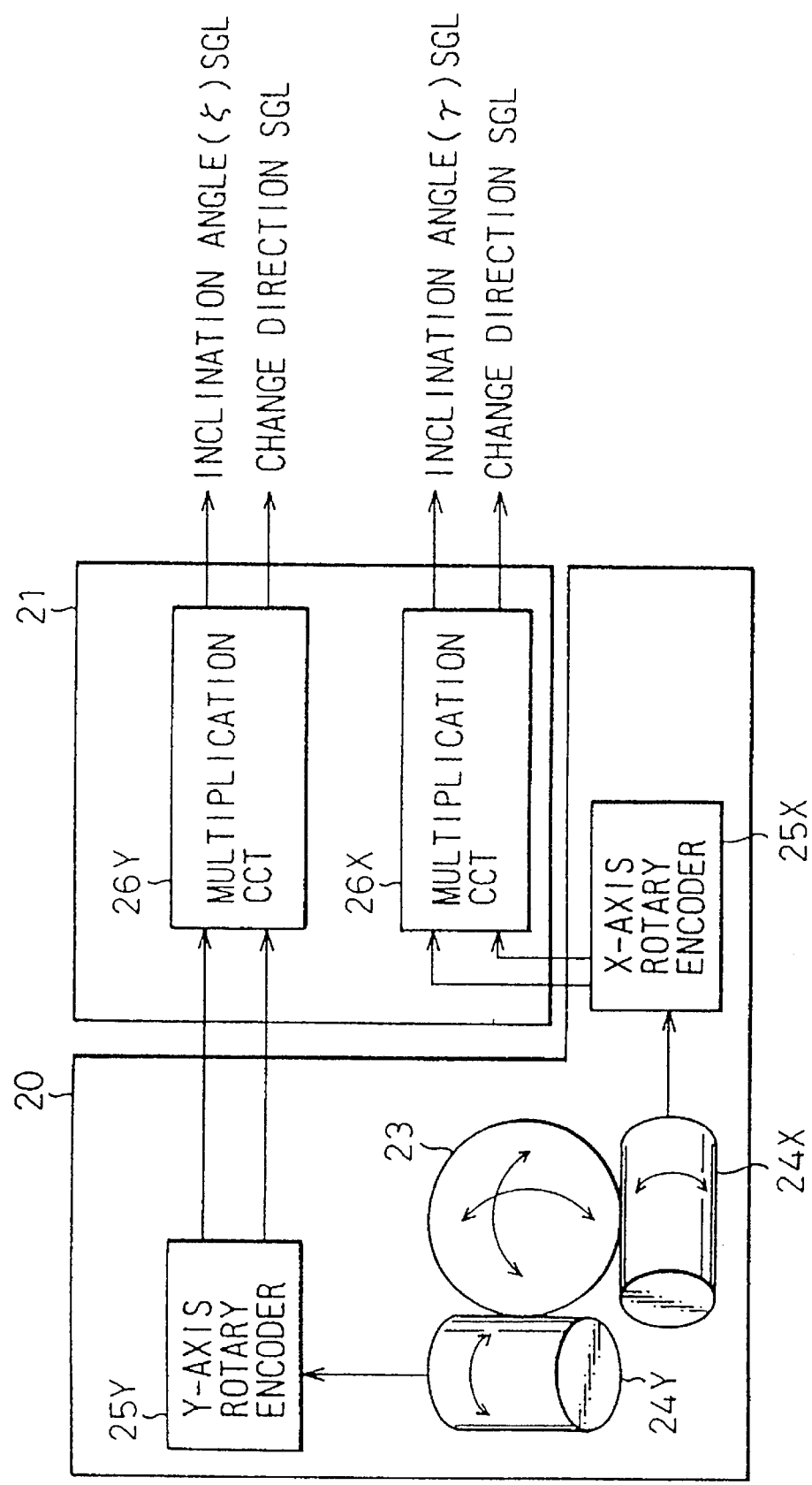

Fig. 7a
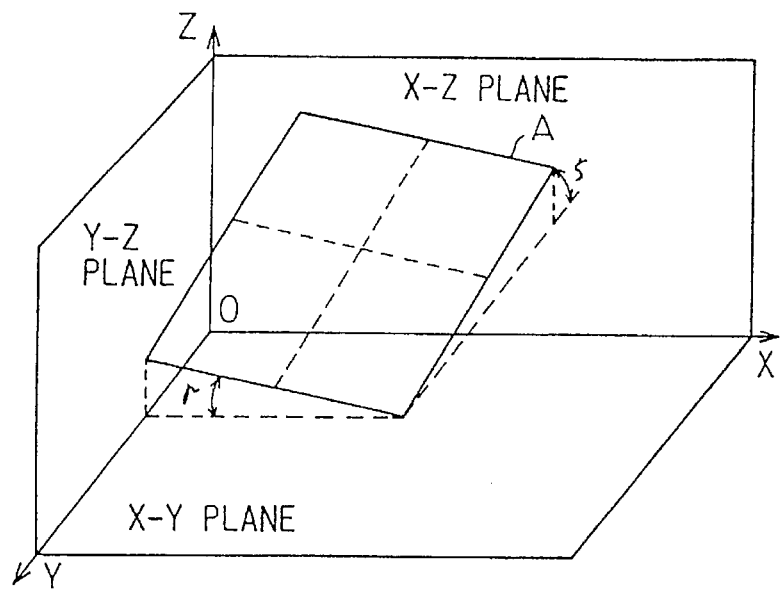
Fig. 7b
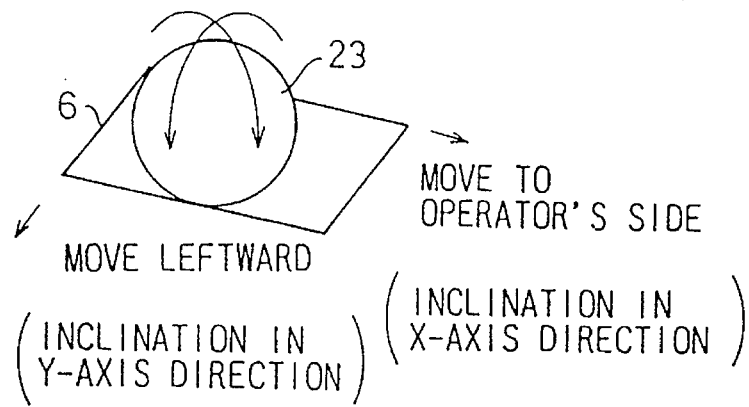
Fig. 7c    Fig. 7d
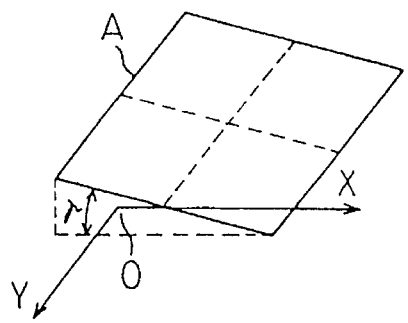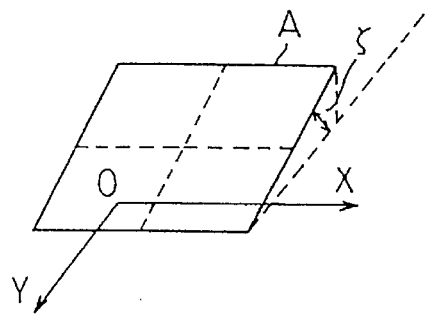

MULTI-DIMENSIONAL COORDINATE INPUT APPARATUS ADAPTED FOR SIMPLE INPUT OPERATION, AND SYSTEM USING THE SAME

This application is a continuation, of application Ser. No. 08/202,566, filed Feb. 28, 1994, now abandoned.

BACKGROUND OF THE INVENTION

1. Field of the Invention

The present invention relates to an improvement of an coordinate input apparatus in the form of a "mouse". More particularly, it relates to a novel multi-dimensional coordinate input apparatus adapted for a simple input operation of coordinates of three or more dimensions, and to an interactive graphic information processing system using the same.

2. Description of the Related Art

In recent information processing systems, it is an important factor to graphically process information and thus realize a smooth interface between an information processing apparatus and operators. On the other hand, with a spread of information processing apparatuses and an increase in processing capability thereof, graphic information to be processed has become complicated, and processings for three-dimensional information such as solid figures have been increased. In these circumstances, there is demand for a multi-dimensional coordinate input apparatus which is handy and can be easily operated.

Conventionally, a mouse-type input apparatus in general use has been an optimal coordinate input apparatus as a two-dimensional plane inputting means. In an input operation of three-dimensional coordinates, however, such a conventional mouse-type input apparatus can only process one plane at a time. Namely, in the input operation of each coordinate on the X-Y plane, Y-Z plane, and X-Z plane in the three-dimensional space, it becomes necessary to carry out switch operations for changing each work plane every time the respective coordinate on each plane is input. This results in an problem in that a handling of the mouse-type input apparatus is troublesome and thus an efficiency in work is lowered.

As a coordinate input apparatus other than a mouse-type input apparatus, an apparatus for exclusive use in the inputting of three-dimensional coordinates is known. However, such an apparatus has a special structure and requires a great deal of skill in the handling thereof, and thus it has not always been appropriate as a simple inputting means in general use.

SUMMARY OF THE INVENTION

An object of the present invention is to provide a multi-dimensional coordinate input apparatus which is handy and practical and can be easily operated, while realizing a relatively simple structure.

Another object of the present invention is to provide a multi-dimensional coordinate input apparatus which can carry out, in a simple manner, the inputting of coordinates on each plane in the multi-dimensional space, and the inputting of a rotational angle or inclination of each plane.

Still another object of the present invention is to provide a system using the above multi-dimensional coordinate input apparatus, which can realize a smooth interactive processing of multi-dimensional graphic information.

According to a first aspect of the present invention, there is provided a multi-dimensional coordinate input apparatus having a hand-operated body and detecting a movement of the body to thereby input coordinate information, the body including: an operation plane provided at the bottom portion of the body and constituted by a combination of a plurality of different input planes which are not located in an identical plane; and a detecting unit provided on at least one of the plurality of different input planes, for detecting a movement of the body.

Also, according to a second aspect of the present invention, there is provided a system for effecting an interactive graphic information processing, the system including: a multi-dimensional coordinate input apparatus having a hand-operated body and detecting a movement of the body to thereby input coordinate information, the body including an operation plane provided at the bottom portion of the body and constituted by a combination of a plurality of different input planes which are not located in an identical plane, and a detecting unit provided on at least one of the plurality of different input planes, for detecting a movement of the body; a display apparatus for displaying a position of coordinate information input by the multi-dimensional coordinate input apparatus, on a picture plane by means of a cursor; a processing apparatus for executing an interactive processing; and a unit for displaying the cursor in a different manner of display for each of the plurality of different input planes provided at the bottom portion of the body, the cursor being displayed in a manner of display by which a work plane which is currently used for the inputting of coordinates can be recognized to an operator.

BRIEF DESCRIPTION OF THE DRAWINGS

Other objects and features of the present invention will be described hereinafter in detail by way of preferred embodiments with reference to the accompanying drawings, in which:

FIGS. 2a to 2e are diagrams illustrating the appearance of the body of the multi-dimensional mouse shown in FIG. 1;

FIGS. 5a to 5e are explanatory diagrams of an example of the graphic processing on the display;

FIG. 6 is a diagram illustrating a constitution of the plane inclination detection unit and the plane inclination measurement unit shown in FIG. 1; and FIGS. 7a to 7d are explanatory diagrams of an operation by which a plane is inclined based on the embodiment of FIG. 1.

DESCRIPTION OF THE PREFERRED EMBODIMENTS

Throughout the description, identical references used in connection with the drawings indicate like constituent elements, and thus the repetition of explanation thereof is omitted.

Figure 1:
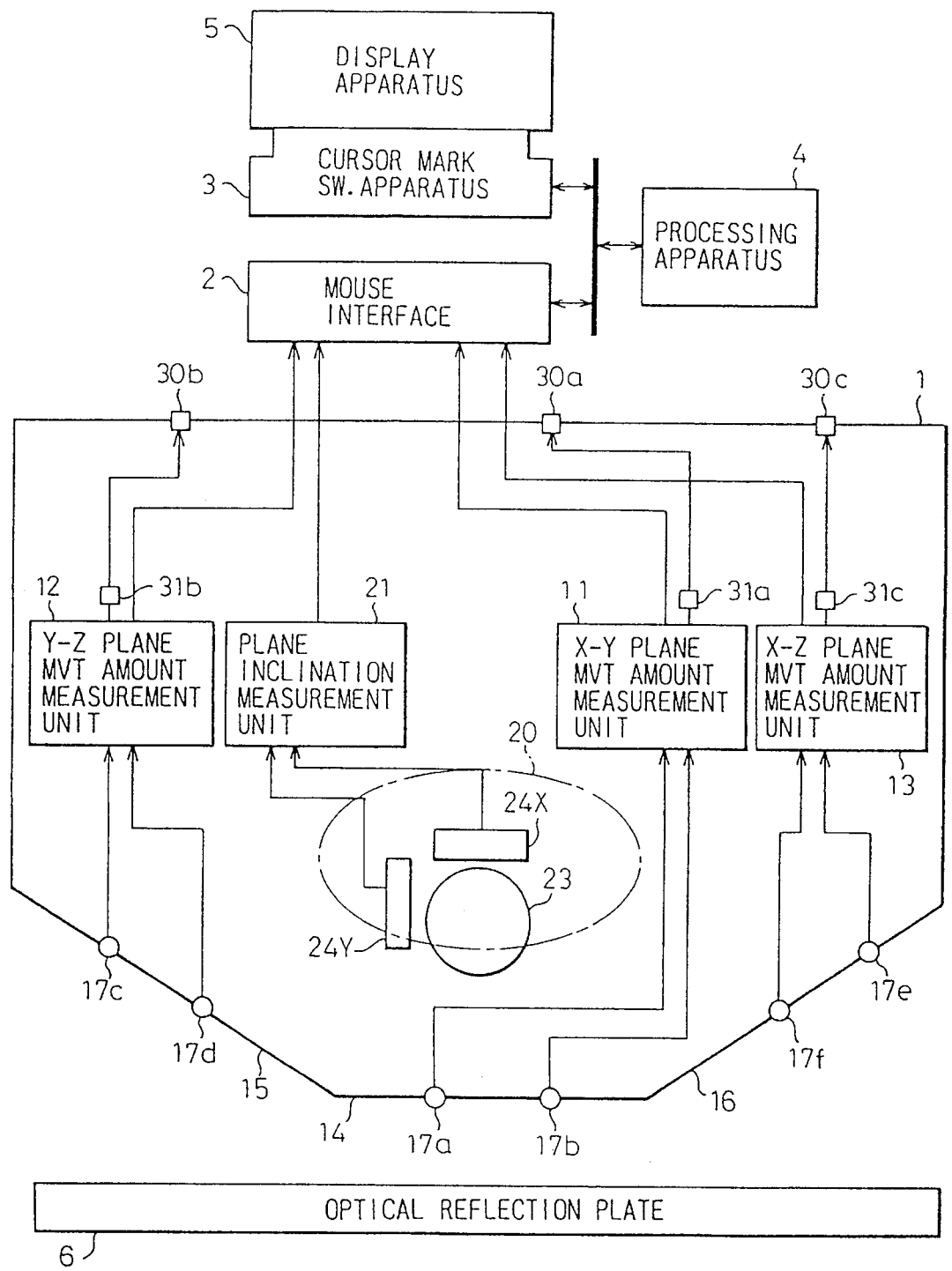
FIG. 1 is a diagram schematically illustrating the constitution of the interactive graphic information processing system including the multi-dimensional coordinate input apparatus (multi-dimensional mouse) according to an embodiment of the present invention.

FIG. 1 schematically illustrates the constitution of the multi-dimensional coordinate input apparatus according to an embodiment of the present invention, and the interactive graphic information processing system using the same. Note, the multi-dimensional coordinate input apparatus is hereinafter simply referred to as a multi-dimensional mouse.

The illustrated system includes a body 1 of the multi-dimensional mouse; a mouse interface 2 for controlling a communication between the multi-dimensional mouse body 1 and a processing apparatus 4; a cursor mark switching apparatus 3 for switching a mouse cursor on a display in accordance with a work plane which is currently in processing; the processing apparatus 4 for executing an interactive processing; a display apparatus 5 for displaying a coordinate position input by the multi-dimensional mouse 1, on the display by means of the cursor, to thereby display graphics or graphic information; and an optical reflection plate 6 for the mouse. The multi-dimensional mouse body 1 and the mouse interface 2, and the processing apparatus 4 and the mouse interface 2 and the cursor mark switching apparatus 3, are connected via cables or buses to each other. Also, the optical reflection plate 6 has a top surface with white and black striped pattern, on which the multi-dimensional mouse body 1 is operated. Note, the mouse interface 2 and the cursor mark switching apparatus 3 may be provided within the processing apparatus 4.

An operation plane provided at the bottom portion of the multi-dimensional mouse body 1 is constituted by a combination of a plurality of different planes (in the present embodiment, four planes 14, 15, 16 and 18 as shown in FIG. 2a) which are not located in an identical plane. Three planes among them are an X-Y input plane 14, a Y-Z input plane 15, and an X-Z input plane 16, respectively, which correspond to the X-Y coordinate plane, Y-Z coordinate plane, and X-Z coordinate plane in the XYZ coordinate space. Also, the respective input planes 14, 15, 16 are each provided with two sets of light-emitting and detecting unit 17a, 17b; 17c, 17d; 17e, 17f, each set being constituted by a light-emitter and a light receiver. Furthermore, the multi-dimensional mouse body 1 is provided with an X-Y plane movement amount measurement unit 11, a Y-Z plane movement amount measurement unit 12, and an X-Z plane movement amount measurement unit 13. Each movement amount measurement unit responds to signals fed from the corresponding two sets of light-emitting and detecting unit, and thus computes a plane movement amount and a rotational angle of the multi-dimensional mouse body 1.

Also, the bottom operation plane of the multi-dimensional mouse body 1 is provided with a fourth input plane (plane inclination input plane 18 shown in FIG. 2a) different from the above three input planes 14 to 16. The fourth input plane is provided with a plane inclination detection unit 20 including a ball 23 used for inputting a respective inclination, i.e., angle of inclination, of each input plane 14 to 16, and a pair of rollers 24X and 24Y rotated in accordance with movements of the ball 23. Furthermore, there is provided a plane inclination measurement unit 21 for computing the respective inclination of each input plane 14 to 16 based on information received from the plane inclination detection unit 20.

On the other hand, at the top portion of the multi-dimensional mouse body 1, there are provided indicators 30a, 30b and 30c for indicating a work plane which is currently in processing (i.e., currently used for the inputting of coordinates), to the operator. Each indicator 30a to 30c is constituted by a light-emitting diode (LED), or the like, and is provided for the corresponding input plane 14 to 16. Furthermore, there are provided LED drivers 31a, 31b and 31c for driving the respective indicators 30a, 30b and 30c.

FIGS. 2a to 2e illustrate the appearance of the the multi-dimensional mouse body 1.

FIG. 2a shows a bottom view of the multi-dimensional mouse body 1. As illustrated, the X-Y input plane 14, the Y-Z input plane 15, and the X-Z input plane 16, respectively, provided with the corresponding two sets of light-emitting and detecting unit 17i, and the plane inclination input plane 18 provided with the ball 23, are combined with different angles from each other. Note, the X-Y input plane 14 is frequently used, compared with other input planes. Accordingly, the X-Y input plane 14 is selected to have a larger area than that of any other input plane, and thus to occupy the position of the center of gravity of the multi-dimensional mouse body 1. This contributes to a facility of the handling of the multi-dimensional mouse body 1. Also, as indicated by references 40a to 40d, four corner portions of the multi-dimensional mouse body 1 are chamfered. This also contributes to a facility of the handling of the multi-dimensional mouse body 1.

FIG. 2b shows a top view of the multi-dimensional mouse body 1. As illustrated, three operation switches 41 to 43 are provided, together with the indicators 30a to 30c for indicating the corresponding work plane, at the top portion of the multi-dimensional mouse body 1. These operation switches 41 to 43 are provided with a predetermined angle with respect to the top surface, so as to comply with the direction of fingers of the operator's hand. Therefore, the handling of the switches can be easily carried out even if the multi-dimensional mouse body 1 is used while being inclined. The operation switches 41 to 43 are used under control of the system or application program when some indication information is input together with coordinate input information, rotational angle information and inclination information on each work plane. Note, FIGS. 2c to 2e show side views of the multi-dimensional mouse body 1, respectively.

Figure 3:
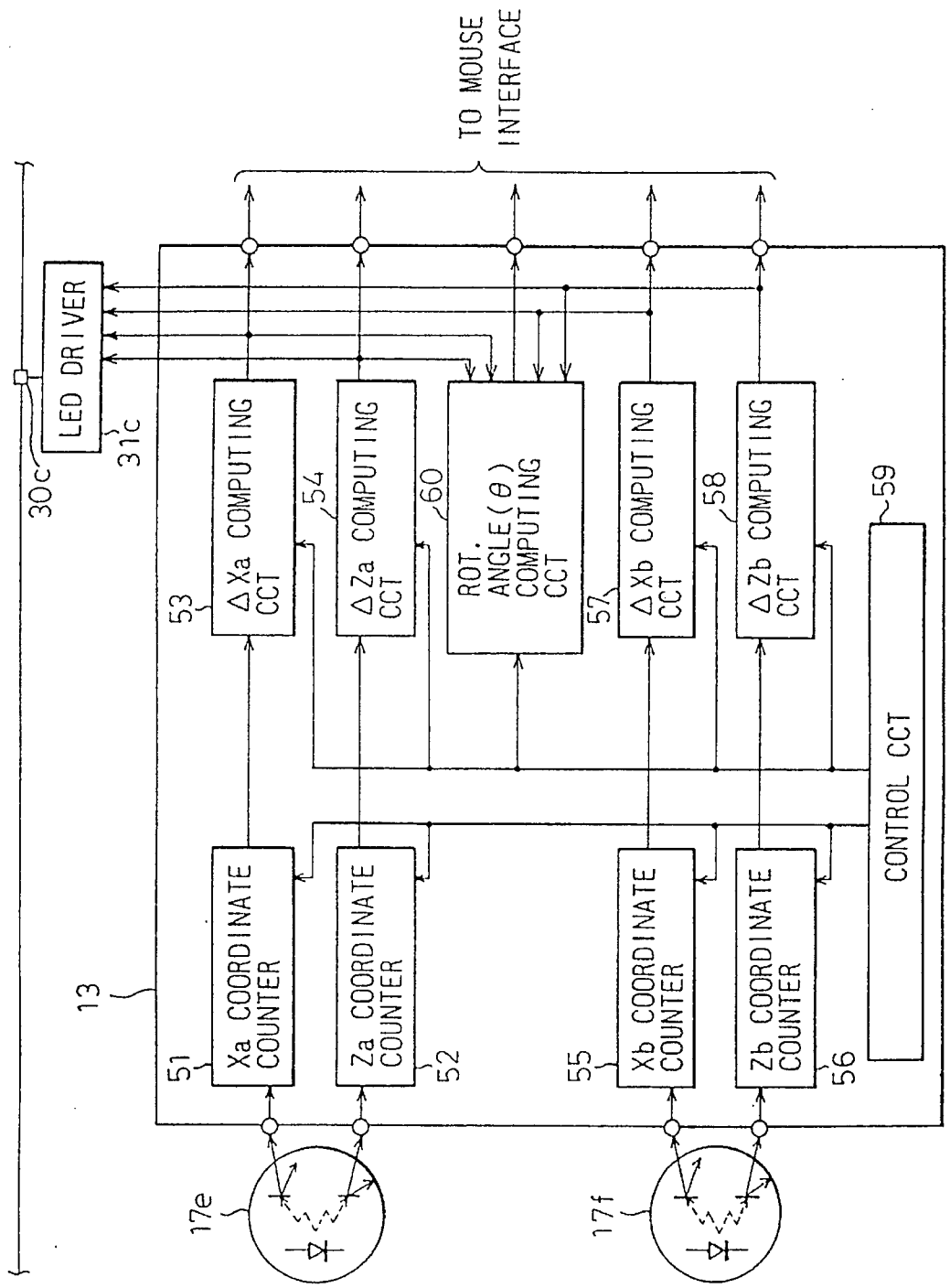
FIG. 3 is a block diagram illustrating a constitution of the X-Z plane movement amount measurement unit shown in FIG. 1.

FIG. 3 illustrates a constitution of the X-Z plane movement amount measurement unit 13. Note, the X-Y plane movement amount measurement unit 11 and the Y-Z plane movement amount measurement unit 12 are constituted in the same manner, respectively, as in the X-Z plane movement amount measurement unit 13. Also, these coordinate acquisition means can be used in the same manner as in an optical mouse on the market.

In FIG. 3, reference 51 denotes an Xa coordinate counter for counting pulses which the light-emitting and detecting unit 17e generates based on a detection of the movement of the multi-dimensional mouse body 1 in the X-axis direction; and reference 52 denotes a Za coordinate counter for counting pulses which the light-emitting and detecting unit 17e generates based on a detection of the movement of the multi-dimensional mouse body 1 in the Z-axis direction. Also, reference 53 denotes a $\Delta$ Xa computing circuit for reading a value before movement (pre-movement value Xa) of the Xa coordinate counter 51 and a value after movement (post-movement value Xa') thereof and, based on the difference between the values, computing a movement amount $\Delta$ Xa; and reference 54 denotes a $\Delta$ Za computing circuit for reading a value before movement (pre-movement value Za) of the Za coordinate counter 52 and a value after movement (post-movement value Za') thereof and, based on the difference between the values, computing a movement amount $\Delta$ Za.

On the other hand, reference 55 denotes an Xb coordinate counter for counting pulses which the light-emitting and detecting unit 17f generates based on a detection of the movement of the multi-dimensional mouse body 1 in the X-axis direction; and reference 56 denotes a Zb coordinate counter for counting pulses which the light-emitting and detecting unit 17f generates based on a detection of the movement of the multi-dimensional mouse body 1 in the Z-axis direction. Also, reference 57 denotes a $\Delta$ Xb computing circuit for reading a pre-movement value Xb and a post-movement value Xb' of the Xb coordinate counter 55 and, based on the difference between the values, computing a movement amount $\Delta$ Xb; and reference 58 denotes a $\Delta$ Zb computing circuit for reading a pre-movement value Zb and a post-movement value Zb' of the Zb coordinate counter 56 and, based on the difference between the values, computing a movement amount $\Delta$ Zb.

Reference 59 denotes a control circuit for controlling operation timings for the counters 51, 52, 55 and 56 and the computing circuits 53, 54, 57 and 58; and reference 60 denotes a rotational angle computing circuit for computing a rotational angle $\theta$ of the multi-dimensional mouse body 1 based on each output of the computing circuits 53, 54, 57 and 58. When the above circuits are in operation, i.e., when the entire measurement unit 13 functions, the LED driver 31c drives and turns ON and OFF the corresponding indicator 30c.

Next, the manner of operation of the multi-dimensional mouse body 1 is explained, citing the case where the inputting of coordinates on the X-Z plane is carried out.

In this case, the multi-dimensional mouse body 1 is operated with being inclined leftward (see FIG. 2a), so that the X-Z input plane 16 provided at the bottom thereof is contacted in parallel with the optical reflection plate 6. Thus, the acquisition of coordinates on the X-Z plane is carried out. At this time, the other input planes (X-Y input plane 14, Y-Z input plane 15) of the multi-dimensional mouse body 1 are not in parallel with the optical reflection plate 6, and thus are in a floating state with respect to the plate 6. Accordingly, lights reflected on the optical reflection plate 6 are not received on the light-emitting and detecting units 17a, 17b and 17c, 17d provided on the X-Y input plane 14 and the Y-Z input plane 15, respectively, and thus, the acquisitions of coordinates on the X-Y plane and the Y-Z plane are not carried out.

When the multi-dimensional mouse body 1 is operated and moved on the optical reflection plate 6, the corresponding light-emitting and detecting units 17e and 17f generate a pulse signal, respectively. The X-Z plane movement amount measurement unit 13 receives the respective pulse signals, and computes respective movement amounts of the multi-dimensional mouse body 1 in the X-axis direction and the Z-axis direction, and a rotational angle $\theta$ of the multi-dimensional mouse body 1. The computed values are transmitted to the mouse interface 2.

In the same manner as the above, where the inputting of coordinates on the X-Y plane is carried out, the multi-dimensional mouse body 1 is operated with being inclined to the operator's side, so that the X-Y input plane 14 is contacted in parallel with the optical reflection plate 6. Thus, the acquisition of coordinates on the X-Y plane is carried out. Also, where the inputting of coordinates on the Y-Z plane is carried out, the multi-dimensional mouse body 1 is operated with being inclined rightward, so that the Y-Z input plane 15 is contacted in parallel with the optical reflection plate 6. Thus, the acquisition of coordinates on the Y-Z plane is carried out.

Additionally, where the angle of inclination of the X-Z plane is changed, the X-Z input plane 16 is first operated as described above, and the multi-dimensional mouse body 1 is then operated with being inclined to a side opposite to the operator's side (see FIG. 2a), so that the plane inclination input plane 18 is contacted in parallel with the optical reflection plate 6. When the plane inclination input plane 18 is moved on the optical reflection plate 6 to thereby rotate the ball 23, the X-Z plane, which is the work plane, can be inclined with an arbitrary angle in the X-axis direction and in the Z-axis direction, as stated later.

Thus, it is possible for the operator to simply move a work plane which is currently in processing, by inclining the bottom operation plane of the multi-dimensional mouse body 1 leftward or rightward, or to the operator's side or the opposite side. In this case, however, a possibility arises in that the operator falls in a state of confusion in the input operation of coordinates unless he or she always grasps or keeps in mind the actual work plane, and thus it is impossible to effectively carry out the input operation.

To cope with this, the indicator 30a, 30b or 30c, corresponding to a work plane which is currently used for the inputting of coordinates, is activated to thereby turn ON and OFF the corresponding LED. Also, the manner of display of the mouse cursor on the picture plane of the display apparatus 5 is changed by the cursor mark switching apparatus 3, to thereby enable the operator to immediately recognize a work plane which is currently in processing.

Next, the manner of coordinate acquisition is explained with reference to FIGS. 4a and 4b.

Figure 4A:
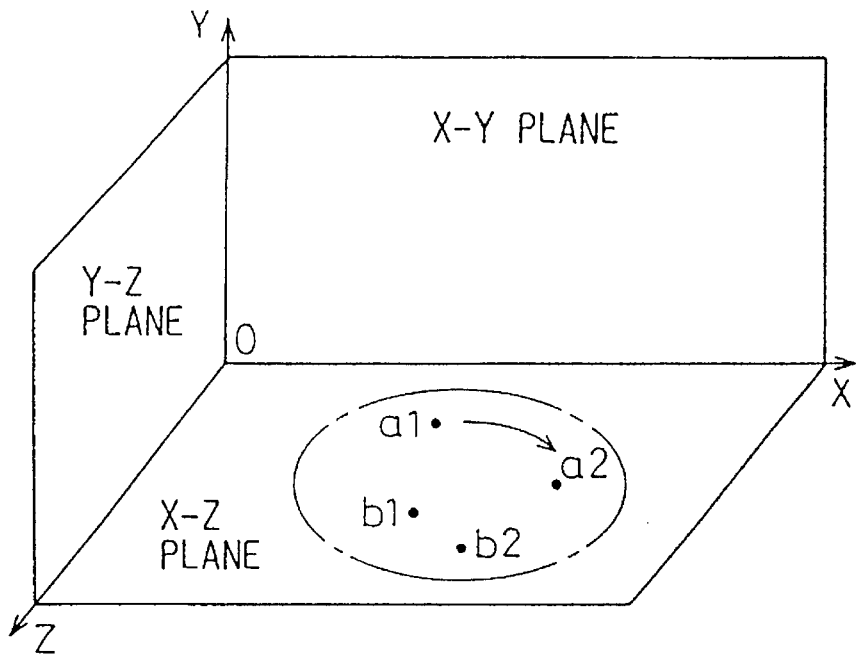
FIGS. 4a and 4b are explanatory diagrams of a coordinate acquisition based on detection of a plane movement amount and a rotational angle of the multi-dimensional mouse.

The illustration of FIG. 4a indicates the case where the inputting of coordinates on the X-Z plane in the three-dimensional (XYZ) coordinate space is carried out. In FIG. 4a, the coordinate point "a1" or "b1" on the X-Z plane indicates the present position of the mouse cursor, and the coordinate point "a2" or "b2" on the X-Z plane indicates a position of the mouse cursor after rotation and movement of the multi-dimensional mouse body 1.

Figure 4B:
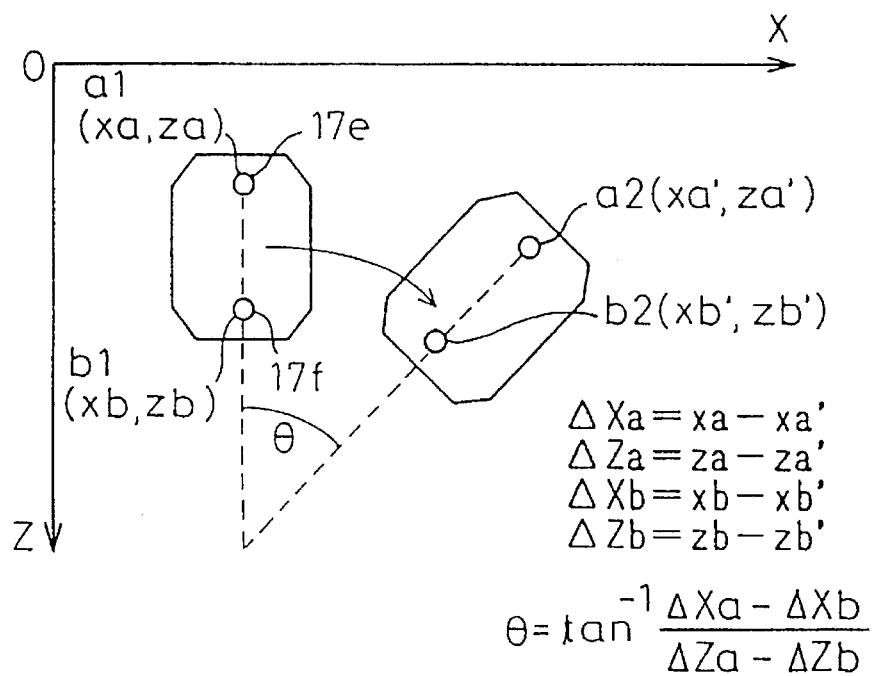

FIG. 4b illustrates the position and operation of the multi-dimensional mouse body 1 on the optical reflection plate 6, corresponding to the portion (see FIG. 4a) surrounded by a dot and dash line on the X-Z plane. Referring to FIG. 4b, the position of the light-emitting and detecting unit 17e of the multi-dimensional mouse body 1 corresponds to the mouse cursor position a1 (xa, za) on the display, and the position of the light-emitting and detecting unit 17f corresponds to the mouse cursor position b1 (xb, zb) on the display. When the multi-dimensional mouse body 1 is rotated and moved, the positions of the light-emitting and detecting units 17e and 17f are moved to the coordinate points a2 (xa', za') and b2 (xb', zb'), respectively. In this case, the movement amounts $\Delta$ Xa and $\Delta$ Za of the light-emitting and detecting unit 17e are computed as (xa-xa') and (za-za'), respectively. In the same way, the movement amounts $\Delta$ Xb and $\Delta$ Zb of the light-emitting and detecting unit 17f are computed as (xb-xb') and (zb-zb'), respectively. Accordingly, the rotational angle $\theta$ of the multi-dimensional mouse body 1 is computed as follows.

$$\theta = \tan^{-1}[(\Delta Xa - \Delta Xb)/(\Delta\Delta Za - Zb)]$$

FIGS. 5a to 5e illustrate an example of the graphic processing on the display.

Where an object graphic 70 as shown in FIG. 5a, which is the object of graphic processing, is rotated, the mouse cursor 71 is first aligned with the object graphic 70 to thereby be brought to a gripped state, and then the multi-dimensional mouse body 1 is operated as shown in FIG. 4b. As a result, the object graphic 70 is rotated by the rotational angle θ determined by the rotational angle computing circuit 60 (see FIG. 3), and displayed as shown in FIG. 5*b*.

The mouse cursor 71 is displayed in the form of a mark shown in FIG. 5*c* in the inputting of coordinates on the X-Y plane; in the form of a mark shown in FIG. 5*d* in the inputting of coordinates on the Y-Z plane; and in the form of a mark shown in FIG. 5*e* in the inputting of coordinates on the X-Z plane. Note, another manner of display, e.g., a manner of changing the color of the cursor mark, may be adopted to thereby enable the operator to recognize a work plane which is currently used for the inputting of coordinates.

FIG. 6 illustrates a constitution of the plane inclination detection unit 20 and the plane inclination measurement unit 21.

In FIG. 6, when the ball 23 is rotated according to a movement of the multi-dimensional mouse body 1, rollers 24X and 24Y are rotated in accordance with a direction of the rotation of the ball 23. The amount of rotation of the roller 24X and the amount of rotation of the roller 24Y are detected by an X-axis rotary encoder 25X and a Y-axis rotary encoder 25Y, respectively, and thus pulse signals corresponding to the respective amounts of rotation are generated. The generated pulse signals sent to multiplication circuits 26X and 26Y. The multiplication circuit 26X, based on the received pulse signal, computes an inclination angle γ in the X-axis direction and outputs the inclination angle signal, together with a signal indicating the direction of change of the inclination. In the same manner, the multiplication circuit 26Y, based on the received pulse signal, computes an inclination angle ζ in the Y-axis direction and outputs the inclination angle signal, together with a signal indicating the direction of change of the inclination. Note, in the present embodiment, it is determined which of the X-Y plane, Y-Z plane and X-Z plane should be inclined, depending on an input plane by way of which the latest input operation of coordinates has been carried out.

FIGS. 7*a* to 7*d* illustrate an example of the operation by which a certain plane is inclined.

For example, an object plane A shown in FIG. 7*a* has an inclination angle γ in the X-axis direction and an inclination angle ζ in the Y-axis direction, with respect to the X-Y plane. In the illustrated case, the ball 23 provided on the plane inclination input plane 18 of the multi-dimensional mouse body 1 is moved with being contacted with the optical reflection plate 6. Namely, the ball 23 is rotated to the operator's side (in the X-axis direction) and leftward (in the Y-axis direction). Thus, it is possible to input the respective inclination angles to thereby incline the object plane A which has been in parallel with the X-Y coordinate plane, and thus to display the object plane A with being inclined.

When the ball 23 is moved with being contacted with the optical reflection plate 6, the movement of the ball 23 is decomposed by the plane inclination detection unit 20 into a movement to the operator's side (inclination in the X-axis direction) and a movement leftward (inclination in the Y-axis direction), as shown in FIG. 7*b*. Based on the movement amounts in the respective directions of the ball 23, the plane inclination measurement unit 21 computes the inclination angle γ in the X-axis direction (see FIG. 7*c*) and the inclination angle ζ in the Y-axis direction (see FIG. 7*d*). As a result, the object plane A is displayed with being inclined by the computed inclination angles γ and ζ, as shown in FIG. 7*a*.

As explained above, according to the present embodiment, a great number of advantages are obtained as described below.

First, it is possible to simply carry out an input operation of coordinates on each plane in the multi-dimensional coordinate space.

Second, it is possible to easily carry out a switching operation of each plane in the multi-dimensional coordinate space.

Third, it is possible to easily input an angle of inclination of each plane in the multi-dimensional coordinate space, and thus to freely incline a solid figure which is the object of graphic processing.

Fourth, it is possible to easily realize a rotation on each plane in the multi-dimensional coordinate space, and thus to freely rotate a solid figure which is the object of graphic processing.

Fifth, based on the mark switching processing of the mouse cursor, it is possible for the operator to immediately recognize a coordinate plane (i.e., work plane) which is currently in processing.

In conclusion, since the bottom operation plane of the mouse body is constituted by the combination of a plurality of different planes which are not located in an identical plane, it is possible to input and process multi-dimensional coordinates with the same sense of operation as that in a conventional mouse-type input apparatus. Accordingly, it is possible to simply carry out processings for solid figure graphic information, and thus to remarkably improve an efficiency in work and an efficiency in processing.

Although, in the above embodiment, the inputting of coordinates on each plane in the three-dimensional coordinate space having the X-Y plane, Y-Z plane and X-Z plane has been explained, the present invention is not restrictive thereto, and is also applicable to the inputting of coordinates in other multi-dimensional coordinate space. For example, the present invention is applicable to the case where a mouse cursor is controlled on each plane in a plurality of two-dimensional planes arranged in parallel with each other. The present invention is also applicable to the case where a mouse cursor is controlled independently for each of a plurality of windows in a multi-window system.

Although the present invention has been disclosed and described by way of one embodiment, it is apparent to those skilled in the art that other embodiments and modifications of the present invention are possible without departing from the essential features thereof.

I claim:

1. A coordinate input apparatus having a hand-operated body to input coordinate information of a work plane, the body comprising:

a bottom portion having first, second, third and fourth input planes which are not all located in the same plane, where the first, second and third input planes correspond, respectively, to an X-Y coordinate plane, a Y-Z coordinate plane and an X-Z coordinate plane of a three-dimensional coordinate space, the X-Y coordinate plane, the Y-Z coordinate plane and the X-Z coordinate plane are individually selectable by selecting the corresponding input plane, coordinate information of a work plane being input in a respective coordinate plane by selecting the coordinate plane, and the fourth input plane includes a plane inclination detection unit for inputting an inclination of a work plane with respect to a selected coordinate plane; and detecting means, provided on at least one of the first, second and third input planes, for detecting movement of the body corresponding to coordinate information to be input.

2. The coordinate input apparatus as set forth in claim 1, wherein a respective detecting means is provided on each of the first, second and third input planes.

3. The coordinate input apparatus as set forth in claim 2, further comprising a respective measuring means corresponding to each detecting means and responsive to movement of the body detected by the corresponding detecting means in a respective coordinate plane, for measuring a movement amount of the body in the respective coordinate plane.

4. The coordinate input apparatus as set forth in claim 3, wherein each detecting means comprises two sets of optical detecting units, and each measuring means is responsive to the optical detecting units of a corresponding detecting means to compute a rotational angle of the body in the coordinate plane of the respective detecting means.

5. The coordinate input apparatus as set forth in claim 1, further comprising respective indicators which correspond to the respective coordinate planes and are provided on the body, each indicator being activated when the corresponding coordinate plane is selected.

6. The coordinate input apparatus as set forth in claim 5, further comprising means for driving the indicators.

7. The coordinate input apparatus as set forth in claim 1, further comprising computing means, responsive to the plane inclination detection unit, for computing a respective angle of inclination with respect to each coordinate plane.

8. The coordinate input apparatus as set forth in claim 1, wherein the area of the bottom portion corresponding to the first input plane is larger than the area of the bottom portion corresponding to either the second input plane or the third input plane.

9. The coordinate input apparatus as set forth in claim 1, wherein corner portions of the body are chamfered.

10. The coordinate input apparatus as set forth in claim 1, wherein the plane inclination detection unit comprises:
   a ball which moves to input an inclination of a work plane; and
   at least two rollers arranged in different directions, wherein movement of the ball causes the rollers to rotate and thereby indicate an inclination angle of the work plane.

11. The coordinate input apparatus as set forth in claim 1, wherein,
   the X-Y coordinate plane, the Y-Z coordinate plane and the X-Z coordinate plane are individually selectable by tilting the body to maintain the corresponding input plane in parallel with a ground plane, and,
   to input an inclination of a work plane with respect to a selected coordinate plane, the plane inclination detection unit contacts the ground plane with the input plane corresponding to the selected coordinate plane maintained in parallel with the ground plane, and is moved in contact with the ground plane, the movement of the plane inclination detection unit along the ground plane indicating the inclination of the work plane.

12. The coordinate input apparatus as set forth in claim 10, wherein,
   the X-Y coordinate plane, the Y-Z coordinate plane and the X-Z coordinate plane are individually selectable by tilting the body to maintain the corresponding input plane in parallel with a ground plane, and,
   to input an inclination of a work plane with respect to a selected coordinate plane, the ball of the plane inclination detection unit contacts the ground plane with the input plane corresponding to the selected coordinate plane maintained in parallel with the ground plane, and is moved in contact with the ground plane.

13. A coordinate input apparatus having a hand-operated body to input coordinate information of a work plane, the body comprising:
   a bottom portion having first, second, third and fourth input planes which are not all located in the same plane, where
      the first, second and third input planes correspond, respectively, to an X-Y coordinate plane, a Y-Z coordinate plane and an X-Z coordinate plane of a three-dimensional coordinate space,
      the X-Y coordinate plane, the Y-Z coordinate plane and the X-Z coordinate plane are individually selectable by tilting the body to maintain the corresponding input plane in parallel with a ground plane, coordinate information of a work plane being input in a respective coordinate plane by selecting the coordinate plane, and
      the fourth input plane includes a plane inclination detection unit, wherein, to input an inclination of a work plane with respect to a selected coordinate plane, the plane inclination detection unit contacts the ground plane with the input plane corresponding to the selected coordinate plane maintained in parallel with the ground plane, and is moved in contact with the ground plane, the movement of the plane inclination detection unit along the ground plane indicating the inclination of the work plane.

14. The coordinate input apparatus as set forth in claim 13, wherein the plane inclination detection unit comprises:
   a ball which contacts the ground plane and moves along the ground plane to indicate the inclination of the work plane; and
   a roller, wherein movement of the ball causes the roller to rotate and thereby indicate an inclination angle of the work plane.

15. An interactive graphic information processing system, comprising:
   a coordinate input apparatus having a hand-operated body to input coordinate information of a work plane, the body comprising
   a bottom portion having first, second, third and fourth input planes which are not all located in the same plane, where
      the first, second and third input planes correspond, respectively, to an X-Y coordinate plane, a Y-Z coordinate plane and an X-Z coordinate plane of a three-dimensional coordinate space,
      the X-Y coordinate plane, the Y-Z coordinate plane and the X-Z coordinate plane are individually selectable by selecting the corresponding input plane, coordinate information of a work plane being input in a respective coordinate plane by selecting the coordinate plane, and
      the fourth input plane includes a plane inclination detection unit for inputting an inclination of a work plane with respect to a selected coordinate plane, and
   detecting means, provided on at least one of the first, second and third input planes, for detecting movement of the body corresponding to coordinate information to be input;
   a display device which has a picture plane and utilizes a cursor to display a position corresponding to the coordinate information input by the coordinate input apparatus, the position being displayed on the picture plane by the cursor, the cursor indicating which of the X-Y coordinate plane, the Y-Z coordinate plane and the X-Z coordinate plane is selected; and a processing device which provides interactive processing between the display device and the coordinate input apparatus.

* * * * *

UNITED STATES PATENT AND TRADEMARK OFFICE
CERTIFICATE OF CORRECTION

PATENT NO. : 5,619,231
DATED : Apr. 8, 1997
INVENTOR(S) : SHOUEN

It is certified that error appears in the above-indentified patent and that said Letters Patent is hereby corrected as shown below:

Col. 6, line 58, in the equation, change "/(ΔΔZa-Zb)]" to --/(ΔZa-ΔZb)]--.

Signed and Sealed this

Twenty-ninth Day of July, 1997

Attest:

BRUCE LEHMAN

Attesting Officer

Commissioner of Patents and Trademarks